US011105373B2

United States Patent
Kick-Rodenbuecher et al.

(10) Patent No.: US 11,105,373 B2
(45) Date of Patent: Aug. 31, 2021

(54) METHOD FOR NON-CUTTING MANUFACTURING OF A BEARING RING FOR A ROLLING BEARING AND ROLLING BEARING COMPRISING THE BEARING RING

(71) Applicant: SCHAEFFLER TECHNOLOGIES AG & CO. KG, Herzogenaurach (DE)

(72) Inventors: Reinhard Kick-Rodenbuecher, Nuremberg (DE); Rainer Eidloth, Herzogenaurach (DE); Markus Mantau, Veitsbronn (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 402 days.

(21) Appl. No.: 15/746,903

(22) PCT Filed: Jun. 8, 2016

(86) PCT No.: PCT/DE2016/200269
§ 371 (c)(1),
(2) Date: Jan. 23, 2018

(87) PCT Pub. No.: WO2017/012615
PCT Pub. Date: Jan. 26, 2017

(65) Prior Publication Data
US 2020/0088237 A1 Mar. 19, 2020

(30) Foreign Application Priority Data
Jul. 23, 2015 (DE) .......................... 102015213967.0

(51) Int. Cl.
*F16C 33/64* (2006.01)
*F16C 19/06* (2006.01)
(Continued)

(52) U.S. Cl.
CPC .............. *F16C 33/64* (2013.01); *F16C 19/06* (2013.01); *B21D 53/10* (2013.01); *B21K 1/04* (2013.01);
(Continued)

(58) Field of Classification Search
CPC ...... F16C 33/64; F16C 19/06; F16C 2220/44; F16C 2220/84; F16C 2220/46;
(Continued)

(56) References Cited

U.S. PATENT DOCUMENTS

2010/0172606 A1 7/2010 Lunz et al.
2014/0068947 A1 3/2014 Mantau et al.

FOREIGN PATENT DOCUMENTS

CN 101027143 A 8/2007
CN 101720260 A 6/2010
(Continued)

OTHER PUBLICATIONS

Cailiao et al., "Mechanical Engineering Materials", Mar. 2015, ISBN 978-7-5621-7252-9, 4 pages.
(Continued)

*Primary Examiner* — Moshe Wilensky
(74) *Attorney, Agent, or Firm* — Dickinson Wright PLLC (57) ABSTRACT

A method of creating a roller bearing, comprising re-shaping a bearing ring blank utilizing cold impact intrusion, wherein the bearing ring blank includes a surface profile that forms at least one contour section within a contact side of the bearing ring upon the re-shaping, and wherein the contact side is configured to contact a support structure.

10 Claims, 4 Drawing Sheets

(51) Int. Cl.
    *B21D 53/10*     (2006.01)
    *B21K 1/04*     (2006.01)

(52) U.S. Cl.
    CPC ...... *F16C 2220/44* (2013.01); *F16C 2220/84* (2013.01)

(58) Field of Classification Search
    CPC ....... F16C 2220/42; B21D 53/10; B21K 1/04; B21J 5/12
    See application file for complete search history.

(56) References Cited

FOREIGN PATENT DOCUMENTS

| | | |
|---|---|---|
| CN | 102861857 A | 1/2013 |
| CN | 203214629 U | 9/2013 |
| CN | 104786021 A | 7/2015 |
| DE | 1938165 A1 | 3/1971 |
| DE | 102007027216 A1 | 12/2008 |
| JP | H1019060 A | 1/1998 |
| JP | 2004028275 A | 1/2004 |
| JP | 2006097809 A | 4/2006 |
| JP | 2010529383 A | 8/2010 |
| WO | 2012155897 A1 | 11/2012 |

OTHER PUBLICATIONS

First Office Action for Chinese Application No. 201680037560.1, dated Nov. 23, 2018, 8 Pages.
Chinese Office Action for Application No. 201680037560.1, dated Aug. 9, 2019, 7 pages.
International Search Report for International Application No. PCT/DE2016/200269 dated Sep. 9, 2016.

METHOD FOR NON-CUTTING MANUFACTURING OF A BEARING RING FOR A ROLLING BEARING AND ROLLING BEARING COMPRISING THE BEARING RING

CROSS-REFERENCE TO RELATED APPLICATIONS

This application is the U.S. National Phase of PCT/DE2016/200269 filed Jun. 8, 2016, which claims priority to DE 10 2015 213 967.0 filed Jul. 23, 2015, the entire disclosures of which are incorporated by reference herein.

TECHNICAL FIELD

The disclosure relates to a method for manufacturing a bearing ring for a roller bearing, wherein the bearing ring has a track side with at least one track and a contact side for contacting a support structure, and wherein the bearing ring defines a main axis of the roller bearing, wherein the bearing ring is manufactured by a re-shaping from a bearing ring blank, and wherein the bearing ring blank has a surface profile. The disclosure also relates to a roller bearing with at least one bearing ring, wherein the bearing ring is manufactured by using such method.

BACKGROUND

In various designs, rolling body bearings comprise an inner ring, an outer ring and a plurality of rolling bodies that are rolling between the inner ring and outer ring. Very often, the inner ring and the outer ring are manufactured from solid material in a metal-cutting way. The advantage of such solid rings is their strong inherent rigidity as well as a low tolerance. However, due to the necessary semi-finished products and the manufacturing method, the production of the solid rings is costly. In view of the above, it was already proposed to produce the rings of a rolling body bearing in a non-cutting manner.

For example, the document DE 10 2007 027 216 A1 discloses a method for a non-cutting production of a roller bearing, with the probably closest related prior art. In this method, it is intended that two ring sections are cut out from a metal sheet, which remain connected to each other via supporting bars. In a subsequent manufacturing step, embossings in form of circumferential grooves are made on one end face of the ring sections. A deep drawing is carried out in a subsequent step, wherein the circumferential grooves become tracks for the roller bearing during the deep drawing procedure and the rolling bodies can be inserted. In the end result, the shape of tracks is determined by the embossings before the deep drawing procedure.

SUMMARY

It is one objective of the disclosure to propose a method for manufacturing a bearing ring for a roller bearing, which can be carried out in a particularly inexpensive way.

The subject-matter of the disclosure is thus a method for manufacturing a bearing ring for a roller bearing. The roller bearing is particularly designed as a radial roller bearing. The bearing ring can be designed as an inner ring or as an outer ring. Additionally, it is also possible that the inner ring as well as the outer ring can be manufactured in accordance with the disclosure. It is especially preferred that the bearing ring is made of metal, in particular of steel.

In one example of the disclosure, the roller bearing can feature any desired number of rolling bodies, in particular balls or rollers. The rolling bodies may be designed as balls. The roller bearing may refer to a deep groove ball bearing, in particular to a single-row roller bearing.

The bearing ring may feature a track side with at least one track for the rolling bodies. The bearing ring furthermore comprises a contact side for contacting a support structure. In the case that the bearing ring is designed as an inner ring, the track side faces towards the radial outer side and the contact side towards the radial inner side. When the bearing ring is designed as an outer ring, the track side faces towards the inner, and the contact side towards the outer side. Optionally, the bearing ring can e.g. be inserted into a recess as support structure or be pushed onto an axis or shaft as support structure.

It is intended that the bearing ring defines a main axis of the roller bearing. The bearing ring either defined the main axis by using the own rotation or by using the movement of the rolling bodies that are rolling on the bearing ring. The track side and/or the contact side may be designed as a cylinder barrel surface, into which the following areas, which are described in the following, are included. In particular, it is referred to a straight cylinder barrel surface which is coaxial and/or concentrically aligned to the main axis.

According to the disclosure, one step of the method is to re-shape the bearing ring blank in order to produce the bearing ring. The method according to the disclosure may thus include at least one step of re-shaping, in order to transfer the bearing ring blank into the bearing ring. By re-shaping, the geometry of the bearing ring is provided by the geometry of the conversion tool, so that also the production of surfaces that usually require a complicated or intricate cutting, can be implemented in a simple and reproducible manner.

The bearing ring blank may feature a surface profile, wherein the surface profile forms at least one contour section within the contact side of the bearing ring after the re-shaping. The at least one contour section is produced in the cylinder barrel surface by using re-shaping techniques. The surface profile may be inserted into the bearing ring blank by using re-shaping techniques. The surface profile may be made, for example, as an embossing or, in deeper surface profiles, already by using an impact extrusion, in particular cold impact extrusion. Alternatively, the surface profile can be molded, for example in such a way, that it protrudes beyond the contact side, in particular beyond on the cylinder barrel surface. It is also possible to provide a hybrid form of the re-shaped and molded surface profile.

A considered option of the disclosure is, that for bearing rings that are produced in a non-cutting manner into semi-finished products, in particular into the bearing ring blank, not only to provide embossings or formations for the track, but to insert the surface profile as well, which forms the contour section within the contact side of the bearing ring after the re-shaping. Thus, functional areas can already be implemented in the contact side of the bearing ring in a cost-efficient way by using a surface profile in the bearing ring blank. Overall, the method according to the disclosure allows for a cost-efficient manufacturing of the bearing ring and thus of the roller bearing.

In one embodiment of the disclosure, the contour section forms a profile, which circulates around the main axis partially, sectionally or completely. The contour section is preferably designed as a section with a groove and thus as a groove, which circulates around the main axis partially, sectionally or completely. It is therefore within the context of the disclosure that the contour section extends only within an angular segment around the main axis. It can also be intended that the contour section is aligned in axial direction. It is also possible that multiple contour sections are inserted. It is however particularly preferred that the contour section forms a groove, which fully circulates around the main axis, particularly enclosing it in circumferential direction. The groove can be designed e.g. as a groove for mounting or as an oil circulating groove. The contour section can basically be used for any desired functional structure on the support structure.

In one embodiment, the contour section may be designed in form of an undercut contour, in particular as an undercut. The undercut contour is formed in relation to the main axis in both axial directions. This structure discloses introducing the surface profile already into the bearing ring blank. As for the bearing ring blank, the surfaces, which later form the contact sides of the bearing ring, are freely accessible, so that any desired structure can be particularly inserted or particularly embossed. The surface profile is only arranged as the contour section after the re-shaping procedure in such a way, that it forms the undercutting contour. The method according to the disclosure thus opens a cost-efficient insertion of the contour section at a location that is difficult to reach in terms of manufacturing during the re-shaping step.

As an alternative or in addition, the contour section may be formed as an elevation contour, which protrudes beyond the contact side. Just as in the case of the undercut contour, this alternative makes use of the fact, that the contour section is not introduced by the tool which causes the re-shaping, but that it was already introduced into the bearing ring blank as the surface profile. The re-shaping is particularly carried out as a folding or bending from the shape of the bearing ring blank into the bearing ring.

Preferably, the undercut contour is made as one or more completely, partially or sectionally circulating groove or grooves. Alternatively, the undercut contour can be designed as a pocket, recess, corrugation, etc. When it is designed as an elevation contour, it can be made as a completely, partially or sectionally circulating bulge, in particular a bar, as one or more elevations etc.

It is also possible to inject such an elevation contour made of a plastic material onto the bearing ring blank and then to form the bearing ring blank into the bearing ring, in particular by means of cold impact extrusion.

It is hereby possible that undercut contours and/or elevation contour exist at the bearing ring blank that is to be formed.

A contour depth of the undercut contour and/or a contour height of the elevation contour that is greater than 0.5 mm is particularly preferred. The contour height or contour depth is measured in relation to a cylinder barrel surface, which is defined by the contact side.

In one implementation, the re-shaping is carried out as a cold forming, in particular a cold impact extrusion. During the cold forming, the temperature in the work piece, in this case in the bearing ring blank or in the bearing ring, is lower than the recrystallization temperature of the base material of the work piece. In particular during the cold forming, the bearing ring blank is subjected to the re-shaping procedure at ambient or room temperature, preferably at a temperature of less than 50 degrees. However, it is possible that higher temperatures occur within the bearing ring blank or within the developing bearing ring during the re-shaping process due to the re-shaping work, wherein higher temperatures are still below the recrystallization temperature of the base material. It is advantageous that surface stresses are generated in the bearing ring by the re-shaping, in particular by the cold forming, which lead to an increase in the performance.

In another implementation, the bearing ring blank is designed as a ring disc, wherein the surface profile is or will be introduced on a first end face of the ring disc by using re-shaping techniques. The ring disc may be cut out of a metal sheet with a thickness of less than 10 millimeters and/or greater than 2 millimeters. It is possible that the ring disc is cut out first and the surface profile is introduced thereafter. However, it is also possible that the surface profile is inserted first and the ring disc with the surface profile is cut out afterwards.

In further development of the disclosure, the ring disc features a further surface profile on a second end face. The second end face is situated on the opposite side of the first end face. The additional surface profile is designed in such a way that if forms the track after the re-shaping.

The surface profile may be designed as an additional undercut contour. This embodiment again makes use of the fact that the corresponding end face of the bearing ring blank is freely accessible for a tool to introduce the additional surface profile, so that regardless of the later re-shaping into the bearing ring, it is also possible to introduce the additional undercut contour. The additional surface profile may be particularly designed as a circumferential groove. After the re-shaping of the bearing ring blank into the bearing ring, this results into a track, in particular a deep groove track, for balls as rolling bodies.

In one example of the disclosure, the final shape of the contour section, in particular of a groove section, is formed by the surface profile, in particular by means of the forming into and/or forming onto, and the re-shaping and/or the final shape of the track is formed by the additional surface profile, in particular by the additional forming into and the re-shaping. The cross-sectional profile of the contour section may be formed by the cross-sectional profile of the surface profile in conjunction with the re-shaping. In like manner, the cross-sectional profile of the track may be formed by the cross-sectional profile of the additional surface profile in conjunction with the re-shaping.

The method according to the disclosure makes it possible to perform a manufacturing that is close to the final shape or a net-shape-manufacturing, in particular of the track and/or of the contour section.

In the further development of the disclosure, the roller bearing features an outer ring and an inner ring, wherein the outer ring and/or the inner ring is or are designed as the bearing ring. A bearing ring blank of the inner ring may be made from an inner portion of a metal sheet section for a bearing ring blank of the outer ring. In this way, the roller bearing with the at least one bearing ring that is made according to the disclosure, can be manufactured in a very cost-efficient way.

An optional addition is that the bearing ring can be case-hardened or completely hardened.

Another aspect of the disclosure relates to a roller bearing with at least one bearing ring, which is particularly manufactured in accordance to the method according to the disclosure. The roller bearing may be designed as previously described.

The roller bearing according to the disclosure includes at least one bearing ring, wherein the bearing ring is preferably manufactured in accordance with the method according to the disclosure, wherein the bearing ring features a track side, wherein at least one track for rolling bodies is arranged on the track side, wherein the bearing ring features a contact side for the contacting of the bearing ring to a support structure, and wherein the bearing ring is manufactured from a bearing ring blank by means of a re-shaping, in particular a cold impact extrusion, wherein the bearing ring features at least one contour section on the contact side, wherein the contour section is made by a surface profile, which is formed within the bearing ring blank.

It is intended that the bearing ring features a track side, wherein one or more tracks for rolling bodies of the roller bearing is or are arranged on the track side. The bearing ring furthermore features a contact side for the contacting of the bearing ring on a support structure, such as an axis or shaft for the inner ring or a housing for the outer ring. The bearing ring is manufactured by means of a re-shaping procedure, in particular by means of cold impact extrusion, from a bearing ring blank.

Such a roller bearing can be manufactured in a very cost-efficient manner. In particular, the bearing rings of the roller bearing according to the disclosure do not feature any surfaces that are made in a metal-cutting manner. In particular in the area of the track surfaces and of the contour section of the bearing rings, no metal-cutting post-processing is carried out, but the surfaces, that are provided after the re-shaping, are directly used in the roller bearing. Thus, the costs for the roller bearing are considerably lower than for conventional roller bearings.

According to the disclosure, it is intended that the bearing ring features at least one contour section on the contact side, wherein the contour section is formed by means of a surface profile within the bearing ring blank. Thus, the contour section has already existed before the re-shaping procedure as the surface profile. The manufacturing of the roller bearing, in particular of the at least one bearing ring, can also be established at the roller bearing as an end product on the basis of manufacturing traces on the at the least one bearing ring.

It is especially preferred that the bearing ring blank is designed as a ring disc, which is formed into a sleeve. Hereby, the first end face of the ring disc forms an outer shell surface and the second end face of the ring disc an inner shell surface of the bearing ring.

Further characteristics, advantages and effects of the disclosure can be derived from the following description or from a preferred embodiment of the disclosure as well as from the attached figures.

DETAILED DESCRIPTION

Figure 1:
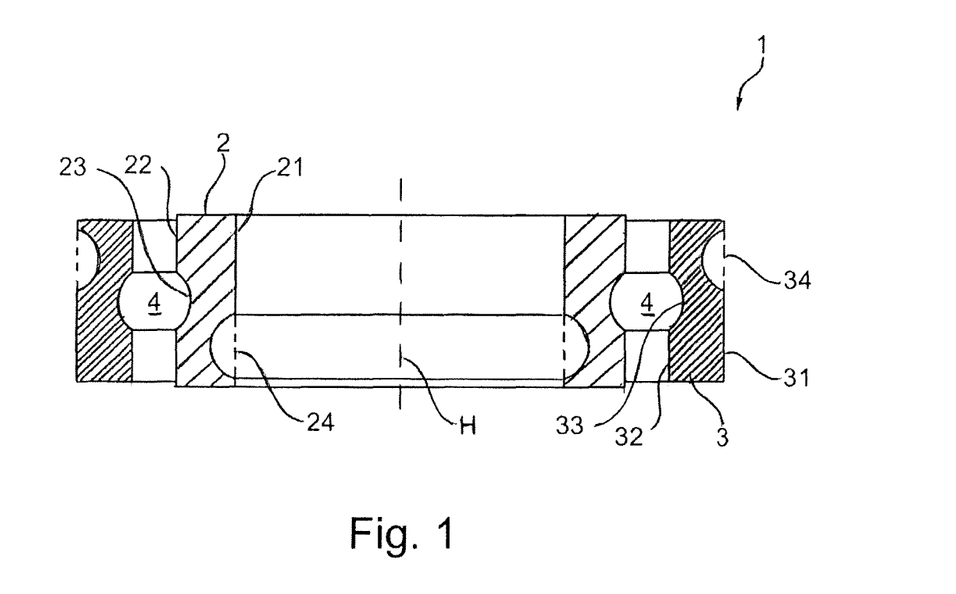
FIG. 1 a schematic longitudinal sectional depiction of the roller bearing as an embodiment of the disclosure.

FIG. 1 shows a roller bearing 1 as an embodiment of the disclosure in a schematic longitudinal sectional depiction.

The roller bearing 1 features an inner ring 2 and an outer ring 3, wherein the outer ring 3 is arranged coaxially and concentrically towards the inner ring 2. The inner ring 2 and the outer ring 3 form a respective bearing ring of the roller bearing 1. The roller bearing 1 features a main axis H, which is defined by means of the rotational axis of the inner ring 2 and/or of the outer ring 3.

The roller bearing 1 may be designed as a deep groove ball bearing with a groove 4 for balls as rolling bodies. However, the depiction of the rolling bodies has been omitted in this case. The roller bearing 1 is implemented as a radial roller bearing. In principle, it is possible that—as shown—the roller bearing 1 is designed in a single row, but the roller bearing 1 can alternatively also be designed to have several rows.

The inner ring 2 features a contact side 21 as well as a track side 22. The contact side 21 is facing radially towards the inner side and is designed in its basic shape as an even cylinder barrel surface, which is aligned coaxially and concentrically to the main axis H. The track side 22 is aligned coaxially and concentrically towards the contact side 21 and is designed in its basic shape as an even cylinder barrel surface. The contact side 21 serves for contacting a support structure, as e.g. to an axis or to a shaft.

The outer ring 3 features a contact side 31 as well as a track side 32. In their basic shape, the contact side 31 and the track side 32 are arranged as cylinder barrel surfaces, respectively, which are aligned coaxially and/or concentrically towards each other and/or towards the main axis H. The contact side 31 serves for contacting a support structure, as e.g. a recess or bore hole within a housing.

On the track side 22 of the inner ring 2 and on the track side 32 of the outer ring 3, a respective track 23 and 33 is formed, which both form the groove 4 together. The tracks 23 and 33 form depressions in the cylinder barrel surface of the track side 22 of the inner ring 2 or in the track side 32 of the outer ring 3.

A contour section 24 is formed as a circumferential groove on the contact side 21 of the inner ring 2. The circumferential groove is formed in relation to one or both axial directions towards the main axis H as an undercut contour. The circumferential groove is particularly located in an inner section of the contact side 21 of the inner ring 2.

Alternatively or additionally, a further groove is introduced as a contour section 34 into the contact side 31 of the outer ring 3. The additional groove is also arranged within an inner area of the contact side 31 of the outer ring 3. The additional groove also forms the undercut contour in relation to the main axis in the axial directions. The contour section 24 and/or 34 can be designed as a groove for mounting or as an oil circulating groove.

Figure 2:
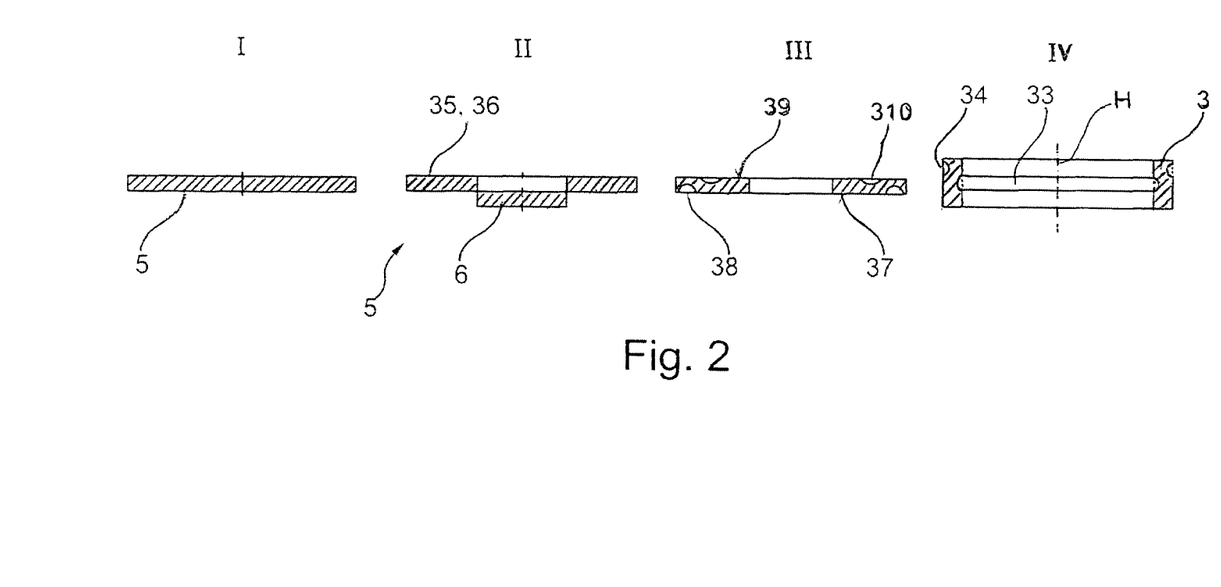
FIG. 2 a schematic longitudinal sectional depiction of a method for the manufacturing of a bearing ring, wherein the bearing ring is designed as an outer ring.

The manufacturing of the outer ring 3 as one of the bearing rings of the roller bearing 1 is depicted in FIG. 2 in various steps in longitudinal section.

In a Step I, a circular blank 5 is separated from a metal sheet, it is particularly punched out of it. In a Step II, a center piece 6 is cut out, particularly punched out, from the circular blank 5, so that a ring disc 35 is formed out of the bearing ring blank 36.

In a Step III, a surface profile 38 in form of a circumferential groove that is running all around the main axis H as a formed-on structure is introduced, in particular formed into, especially embossed onto a first end face 37, which is facing downwards in FIG. 2. For example at the same time or shortly afterwards, another surface profile 310 is introduced, in particular formed into, especially embossed onto a second end face 39, which is also designed as a circumferential groove. It can be intended that Step II and Step III are exchanged, so that the formation is already embossed into the circular blank 5 or even into the metal sheet as semi-finished product, before the circular blank 5 is cut out.

In a Step IV, the bearing ring blank 36 is re-shaped, wherein the re-shaping is carried out as a cold forming, in particular a cold impact extrusion. The bearing ring blank 36 is particularly not heated and/or re-shaped at ambient or room temperature. It is particularly intended that the re-shaping is carried out at a temperature that is below the recrystallization temperature of the metal sheet.

By utilizing the re-shaping process, the bearing ring blank 36, which is made in form of a ring disc 35, is re-shaped into a sleeve, into which the track 33 has been introduced on basis of the additional surface profile 310 and a contour section 34 in form of a groove has been introduced on basis of the surface profile 38, see also FIG. 1.

It should be noted that the shape of track 33 and of the further groove is accomplished by utilizing the re-shaping that was performed in the previous step, in particular in Step III, and by utilizing the re-shaping that was done in Step IV and in particular without any further re-shaping measures. The surface of track 33 especially corresponds to the surface of the further surface profile 310, which was particularly not finished with any metal-cutting techniques and/or the surface of the additional groove corresponds to the surface of the surface profile 38.

Figure 3:
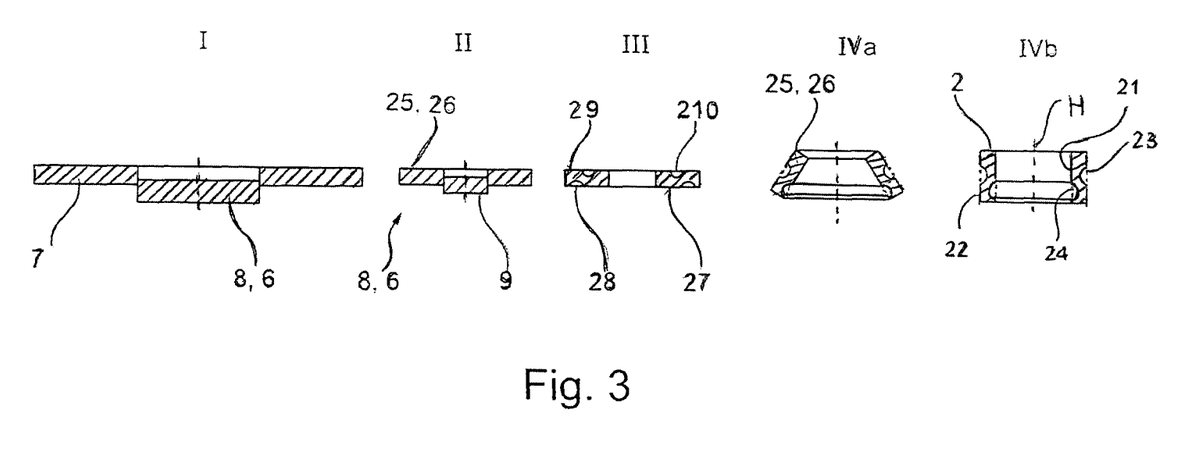
FIG. 3 a schematic longitudinal sectional depiction of a method for the manufacturing of a bearing ring, wherein the bearing ring is designed as an inner ring.

In a similar way, FIG. 3 depicts the method for the manufacturing of the inner ring 2 as bearing ring of the roller bearing 1 in longitudinal section.

In a Step I, a circular blank 8 is cut out of a metal sheet 7. As an alternative to this, the center piece 6 from the previously described method is used as circular blank 8 in order to form the outer ring 3 according to FIG. 2. In this case it is possible that the inner ring 2 and the outer ring 3 are manufactured from the same area of a metal sheet 7 in a mother-child-production.

In a Step II, a further ring disc 25 is produced out of the circular blank 8 and/or out of the center piece 6 by separating or punching out of a center piece 9. The ring disc 25 forms the base body for a bearing ring blank 26 for the inner ring 2.

In a Step III, a surface profile 28 is formed, or particularly embossed, on a first end face 27 in the same way as it was done for the outer ring 3. Furthermore, another surface profile 210 is formed, or particularly embossed, on the second end face 29. The surface profile 28 will later form the contour section 24 in form of a groove, the further surface profile 210 will later form the track 23 of the inner ring 2. The surface profiles 28 and 210 are designed as circumferential grooves, respectively.

In a Step IVa and IVb, a re-shaping procedure is carried out, which is performed as a cold forming procedure, in particular a cold impact extrusion, and wherein the ring disc 25 is formed or bent as the bearing ring blank 26 into the inner ring 2. Hereby, track 23 is formed on the track side 22 of the inner ring 2 and the contour section 24 on the contact side 21 of the inner ring 2. FIGS. 4a-d depict one respective bearing ring blank 26 or 36 with one surface profile 28 or 38 as well as bearing ring 2 or 3 with the contour section 24 or 34, that is resulting thereof. A top view on a bearing ring blank 26 or 36 is depicted on each respective left side, and a cross-sectional cut through the bearing ring 2 or 3, that is formed thereof, is shown on the right side of each depiction.

Figure 4A:
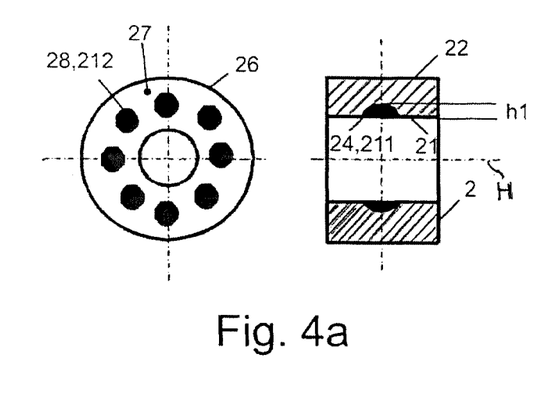
FIGS. 4a, b, c, d include four different embodiments of the disclosure for a bearing ring as well as the underlying bearing ring blank, wherein a top view on a bearing ring blank is depicted on each respective left side, and a cross-sectional cut through the bearing ring, that is formed thereof, is shown on the right side of each depiction.

Thus, FIG. 4a depicts on the right side an inner ring 2 with a contour section 24 on the contact side 21, wherein the contour section 24 is formed as a plurality of depressions 211 that are distributed in circumferential direction around the main rotational axis H, and is thus formed as an undercut contour. Herein, only the depressions 210 on the contact side 21 are shown within the depicted cross-sectional plane. A depiction of the further existing depressions 212 on the contact side 21 was omitted for reasons of clarity. A bearing ring blank 26 is depicted on the left side, wherein it features a surface profile 28 on the first end face 27, which is designed as a plurality of depressions 212 that are arranged within a concentric circle. The depressions 212 feature a contour depth h1 of more than 0.5 mm. The inner ring 2 is manufactured from the bearing ring blank 26 by using a cold forming, in particular by means of cold impact extrusion.

Figure 4B:
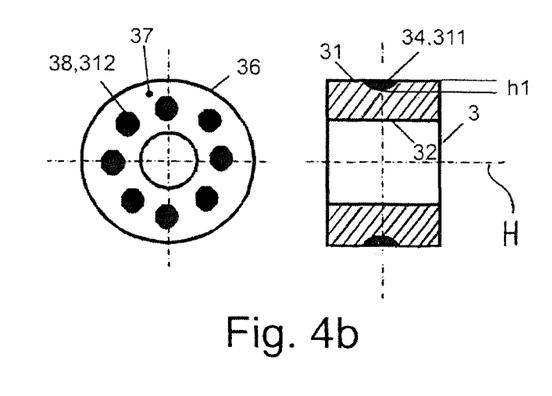

FIG. 4b depicts—in the same manner as in FIG. 4a—on the right side an outer ring 3 with a contour section 34 on the contact side 31 wherein the contour section 34 is formed as a plurality of depressions 311 that are distributed in circumferential direction around the main rotational axis H, and is thus formed as an undercut contour. A bearing ring blank 36 is depicted on the left side, wherein it features a surface profile 38 on the first end face 37, which is designed as a plurality of depressions 312 that are arranged within a concentric circle. The depressions 312 feature a contour depth h1 of more than 0.5 mm. The outer ring 3 is manufactured from the bearing ring blank 36 by using cold forming, in particular by using cold impact extrusion.

Figure 4C:
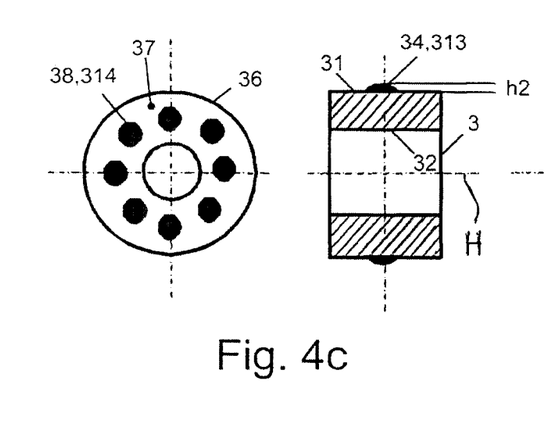

FIG. 4c depicts—in the same depiction as in the FIGS. 4a, 4b—an outer ring 3, which carries elevations 313 as contour section 34, in contrast to the embodiments in FIG. 4b and which thus realizes an elevation contour with a contour height h2 of at least 0.5 mm. In order to produce the elevations 313, bearing ring blank 36 features elevations 314 as surface profile 38, which are distributed concentrically with regards to the center of the bearing ring blank 36. The elevations 314 are particularly formed injection molding of plastic material onto the bearing ring blank 36. The outer ring 3 is manufactured from the bearing ring blank 36 by a cold forming, in particular by cold impact extrusion.

Figure 4D:
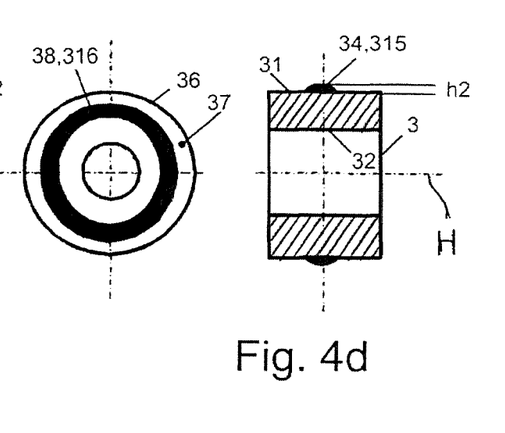

In contrast to FIG. 4c, outer ring 3 in FIG. 4d carries a continuous bulge 315 as contour section 34 in form of an elevation contour with the contour height h2, which is formed by a bulge 316 as surface profile 38 on the bearing ring blank 36. The bulge 315 is particularly formed by injection molding of plastic material onto the bearing ring blank 36. The outer ring 3 is manufactured from the bearing ring blank 36 by cold forming, in particular by cold impact extrusion.

In the FIGS. 4a-d, a separate depiction of the tracks of the bearing rings was omitted. But it is generally possible that tracks 23, 33 are formed on the track side 22, 32 (see FIG. 1) in order to house rolling bodies in form of balls, cylindrical rollers, tapered rollers, needles, ton-shaped rollers, wherein it is also possible to design multiple rows of roller bearings, in which rolling bodies are used in two or more rows of the same or of different kinds and/or of different sizes.

In the four embodiments in the FIGS. 4a-d, the surface profile 28 or 38 is applied or introduced onto the bearing ring blank 26 or 36 and transferred into the contour section 24 or 34 by using the re-shaping of the bearing ring blank 26 or 36 into the inner ring 2 or outer ring 3.

REFERENCE SIGN LIST

1 Roller bearing
2 Inner ring
21 Contact side

22 Track side
23 Track
24 Contour section
25 Ring disc
26 Bearing ring blank
27 first end face
28 Surface profile
29 Second end face
210 Additional surface profile
211 Depressions
212 Depressions
3 Outer ring
31 Contact side
32 Track side
33 Track
34 Contour section
35 Ring disc
36 Bearing ring blank
37 First end face
38 Surface profile
39 Second end face
310 Additional surface profile
311 Depressions
312 Depressions
313 Elevations
314 Elevations
315 Bulge
316 Bulge
4 Deep groove
5 Circular blank
6 Center piece
7 Metal sheet
8 Circular blank
9 Center piece
H Main axis
H1 Contour depth
H2 Contour height

The invention claimed is:

1. A bearing ring for a roller bearing comprising:
an inner ring;
a track side of the inner ring, wherein the track side includes at least one track;
a contact side of the inner ring contacting a support structure; and
a main axis of the bearing ring that defines the roller bearing, wherein the main axis is defined by a rotational axis of the inner ring, wherein the bearing ring is formed from a bearing ring blank, wherein the bearing ring includes a surface profile, wherein the surface profile forms an inner ring contour section within the contact side of the bearing ring, wherein the inner ring contour section includes a groove that circulates the main axis defined by the bearing ring, wherein the groove circulates around the main axis and encloses the main axis in a circumferential direction, wherein one or more surfaces of the bearing ring are not made in a metal-cutting manner, and wherein the inner ring contour section forms a profile that circulates around the main axis, wherein the profile is formed from a bearing ring blank, wherein the roller includes an outer ring that includes an outer ring contour section on an outer ring contact side, wherein the outer ring further includes an outer ring track side, wherein the outer ring is arranged coaxially and concentrically towards the inner ring, wherein the outer ring contour section is offset from the inner ring contour section with respect to the main axis, wherein the outer ring contour section is an elevation contour with reference to an axial direction of the main axis.

2. The bearing ring of claim 1, wherein the inner ring contour section forms a profile that circulates around the main axis partially, sectionally, or completely.

3. The bearing ring of claim 1, wherein the elevation contour includes at least one circulating bulge, one elevation, or one array of elevations.

4. The bearing ring of claim 1, wherein the elevation contour of the contour section includes a contour height of at least 0.5 mm.

5. The bearing ring of claim 4, wherein an additional surface profile is formed onto a second end face of the ring disc, wherein the additional surface profile forms the track.

6. The bearing ring of claim 5, wherein the additional surface profile is formed as at least one additional undercut contour and that the at least one track is formed by the at least one additional undercut contour.

7. The bearing ring of claim 1, wherein a final shape of the inner ring contour section is configured to be formed onto by the surface profile by re-shaping.

8. A roller bearing comprising:
a bearing ring, wherein the bearing ring includes an inner ring with a track side with at least one rolling body track; and
a contact side of the inner ring, wherein the contact side is configured to contact the bearing ring to a support structure and comprises at a first contour section on the contact side, wherein the contour section is made by using a surface profile formed within a bearing ring blank, wherein the contour section includes a groove that circulates the main axis defined by the bearing ring, wherein the groove circulates around the main axis and encloses the main axis in a circumferential direction, wherein the roller bearing includes an outer ring that includes an outer ring contour section on an outer ring contact side, wherein the outer ring further includes an outer ring track side, wherein the outer ring is arranged coaxially and concentrically towards the inner ring, wherein the outer ring contour section is always radially and axially offset from the inner ring contour section with respect to the main axis, wherein the outer ring contour section is an elevation contour with reference to an axial direction of the main axis.

9. The roller of claim 1, wherein the contour section is formed as an elevation contour that protrudes beyond the contact side.

10. The roller of claim 1, wherein the inner ring contour section and the outer ring contour section are not axially and radially aligned.

* * * * *